United States Patent [19]

Dickinson et al.

[11] 4,035,627

[45] July 12, 1977

[54] SCIENTIFIC CALCULATOR

[75] Inventors: Peter D. Dickinson, Monte Sereno; Thomas E. Osborne, San Francisco; France Rode; Allen J. Baum, both of Los Altos, all of Calif.

[73] Assignee: Hewlett-Packard Company, Palo Alto, Calif.

[21] Appl. No.: 566,142

[22] Filed: Apr. 8, 1975

Related U.S. Application Data

[62] Division of Ser. No. 364,570, May 29, 1973, abandoned.

[51] Int. Cl.² .................. G04B 47/00; G06F 15/20
[52] U.S. Cl. .......................... 235/156; 58/152 R
[58] Field of Search ........... 235/156, 152; 58/50 R, 58/152 R

[56] References Cited

U.S. PATENT DOCUMENTS

| | | | |
|---|---|---|---|
| 3,788,058 | 1/1974 | Idei et al. | 58/50 R X |
| 3,803,834 | 4/1974 | Reese | 58/152 R |
| 3,813,533 | 5/1974 | Cone et al. | 235/156 |
| 3,816,730 | 6/1974 | Yamamoto et al. | 235/156 |
| 3,818,457 | 6/1974 | Schleifer | 340/172.5 |

Primary Examiner—David H. Malzahn
Attorney, Agent, or Firm—F. D. LaRiviere

[57] ABSTRACT

A battery powered hand-held calculator for performing arithmetic, triganometric and logarithmic functions and displaying the results thereof is provided with a clock mode which performs the function of a clock and displays real time or the function of a stopwatch and stores and displays the times at which recorded events have taken place.

33 Claims, 4 Drawing Figures

NOTE: ALL LOOPS CONTAIN NUMBER OF PROGRAM STEPS

SCIENTIFIC CALCULATOR

CROSS-REFERENCE TO RELATED APPLICATION

This application is a division of U.S. Pat. application, Ser. No. 364,570 entitled "Improved Scientific Calculator," filed by Peter D. Dickinson, et al. on May 29, 1973, now abandoned in favor of continuation application Ser. No. 566,143 entitled "General Purpose Calculator Having Selective Data Storage, Data Conversion and Time-Keeping Capabilities" filed Apr. 8, 1975 by Peter D. Dickinson et al. U.S. Pat. No. 4,001,569, also a division of abandoned U.S. Pat. application Ser. No. 364,570, is hereby incorporated by reference as if fully set forth herein.

SUMMARY OF THE INVENTION

The calculator of the present invention includes a clock mode in which the calculator accumulates and displays the time of day (real time) or, alternatively can be set to display the time events take place (stopwatch), the elapsed time between events or the elapsed time of several events beginning at the same time and ending at different times (splits). Operation of the clock mode is based on a substantially constant number of program instructions executed by the calculator every 100th of a second as controlled by a master oscillator.

DESCRIPTION OF THE DRAWINGS

FIGS. 3–34 and FIG. 37 may be found in the above incorporated U.S. Patent.

In the clock mode of the present invention, the calculator operates as a clock or a stopwatch which stores and displays split times. Referring to FIGS. 1, 2, 35 and 36, the clock mode operates as follows: a time of day is entered into the calculator display where the two digits to the left of the decimal point represent hours, the two digits immediately to the right of the decimal point represent minutes, the next two digits represent seconds, and the last two digits represent hundredths of a second. The clock mode is initiated by pressing Recall key (RCL) 118 followed by Enter key 116. Enter key 116 will always start the clock; Change Sign key (CHS) will toggle the clock and make it start or stop (whichever it is not doing when this key is pressed); Enter Exponent key (EEX) will blank or unblank the hundredths of a second portion of the display (whichever is not being done when this key is pressed), although the clock will continue running. The clear X key (CLX) clears the clock to zero, and the summation key ($\Sigma +$) always stops the clock.

Split times are stored by pressing a digit key while the clock is running, which stores the time at which the digit key is pressed in a storage register of the same number as the digit key pressed. If the clock is not running, pressing a digit key will recall the constant (e.g. previously stored split) in the register of the same number as the digit key pressed.

There are many applications for the clock mode of the present invention. For use as a stopwatch the clock is started when a race begins. When the first runner crosses the finish line, the "one" digit key is pressed and his time of arrival is stored in register one, without interrupting clock operation. When the second runner crosses the finish line, the "two" digit key is pressed and his time is stored in register two, and so forth up to 10 finishers. At the end of the race, pressing the summation key ($\Sigma +$) stops the clock. Pressing the digit keys corresponding to the respective arrivals then recalls the elapsed time for each runner during the race.

Figure 1:
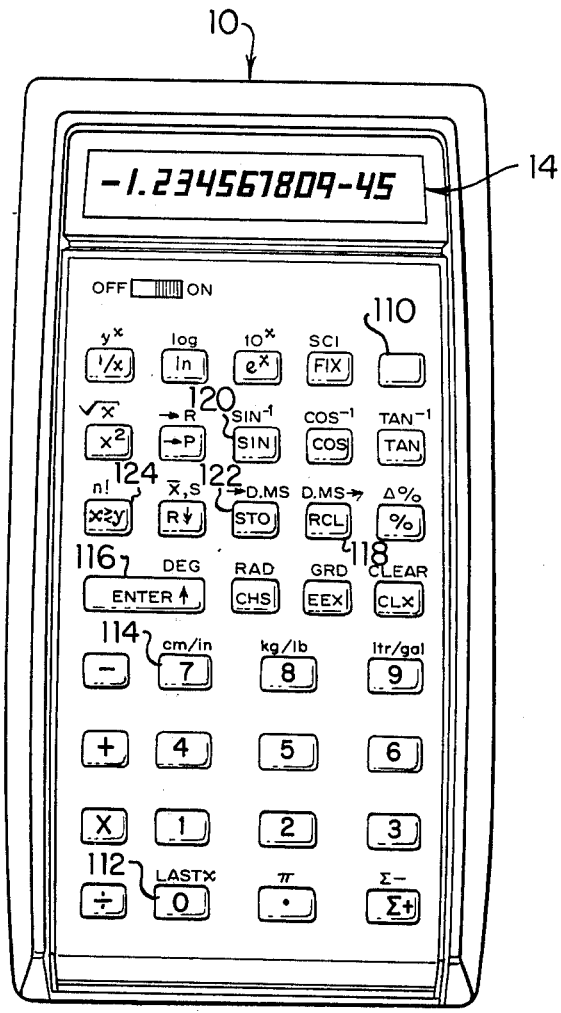
FIG. 1 is a top view of a general purpose calculator having selective time-keeping and time data computing capabilities according to the preferred embodiment of the invention.
Figure 2:
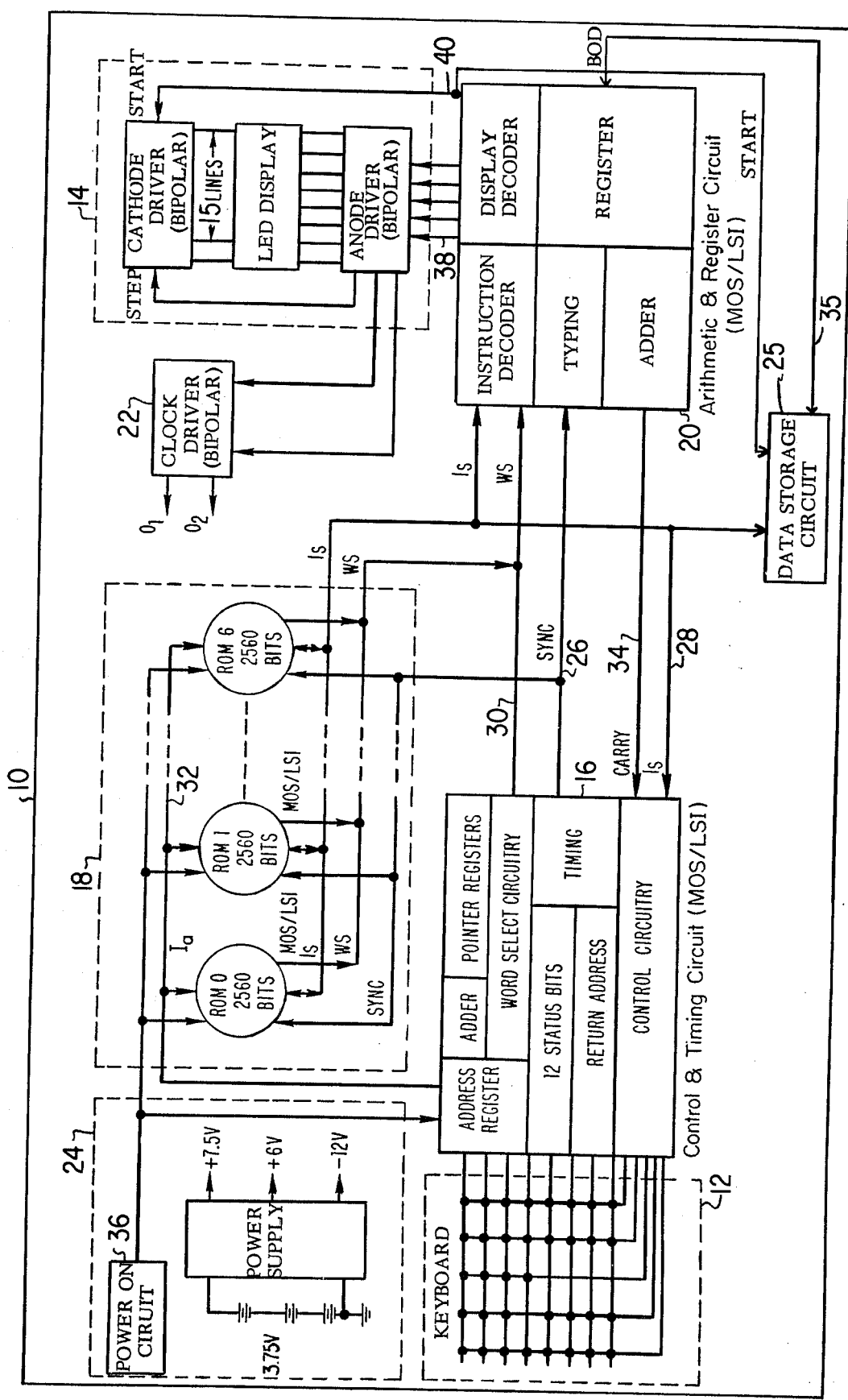
FIG. 2 is a block diagram of the calculator of FIG. 1.
Figure 35:
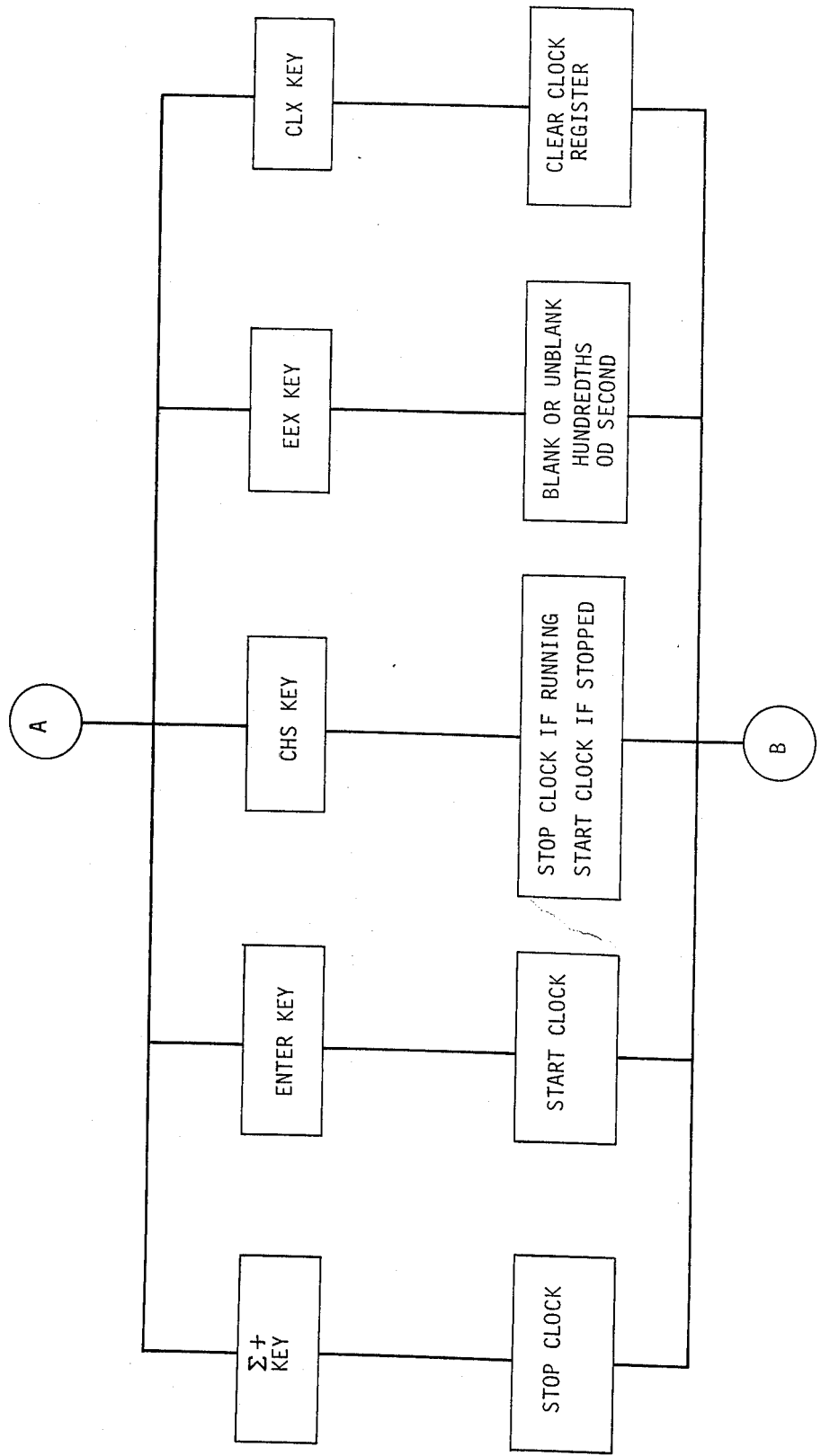
FIG. 35 is a flow diagram showing the keys to be operated in performing functions when the calculator of FIGS. 1 and 2 is the clock mode.
Figure 36:
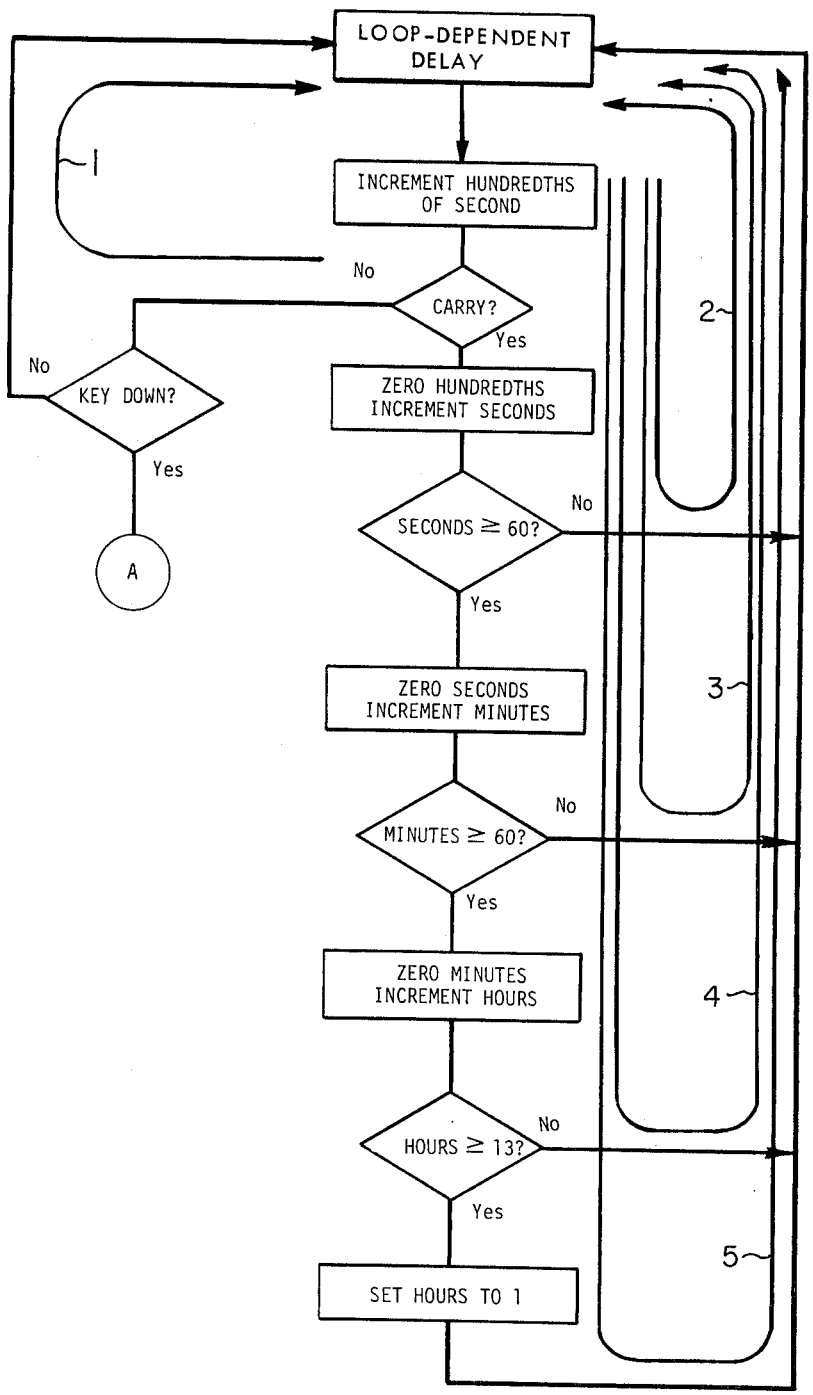
FIG. 36 is a flow diagram of the program clock of the calculator of FIGS. 1 and 2 showing loops depicting hundredths of a second, seconds, minutes and hours.

The clock mode is based on the characteristic that the same number of instructions are executed by the calculator every one-hundredth of a second as controlled by the 800 KHz oscillator 100. Referring to FIG. 36, loops 1, 2, 3, 4 and 5 each never contain more than 35 instructions which is equal to the time taken to increment the hundredths-of-a-second register. While 35 instructions are required to adhere to the clock standard, many fewer than 35 instructions are required to execute any loop of the program. Therefore, loop execution must include additional instructions equivalent to the difference between 35 instructions and the number of instructions required to execute the loop. However, the amount of delay, i.e. the number of no-op code or other instructions to be added that are unrelated to operation of the clock, is "loop-dependent", since the number of instructions required to execute each loop is different. For example, during execution of loop 1, which is executed when there is no carry in the hundredths-of-a-second register, the status of the keys associated with clock control on the keyboard is determined every one hundredth of a second until there is such a carry. During execution of loop 2, a few of the remainder of the 35 instructions available are used to zero the hundreds-of-a-second register and to add one to the seconds register. Every 59 seconds, a few more of the remainder of the 35 available instructions for execution of loop 3 are used to zero the seconds register and add one to the minutes register; every 59 minutes, some more of the remainder of the 35 available instructions for execution of loop 4 are used to zero the minutes register and increment the hours register; and finally every 12 hours a few more of the remainder of the 35 available instructions for execution of loop 5 are used to reset the hours register to one. Thus, every 12 hours the hundreds-of-a-second register is zeroed 360,000 times, the seconds register is zeroed 3,600 times and the minutes register is zeroed 60 times. Refer to U.S. Pat. No. 4,001,569.

We claim:

1. An electronic calculator having a calculator mode and a time-calculating mode for use as a realtime timekeeping device, comprising:
   an input unit, including a plurality of manually operable keys, for initiating the modes of operation of the calculator;
   a memory unit for storing microinstructions;
   a plurality of storage registers for storing a plurality of numbers representing progressively larger units of time;
   a processing unit, coupled to the input unit, memory unit and storage registers, responsive in the time-calculating mode to a preselected total number of microinstructions executed per smallest unit of time being calculated by the processing unit for repetitively incrementing the number representing the smallest unit of time, that number being zeroed when it exceeds a selected value, and, following each such zeroing of that number, incrementing the numbers representing each remaining progressively larger unit of time when the number representing the largest preceding unit of time relative thereto is zeroed, said lastmentioned numbers being zeroed when they exceed selected values, unless the number being incremented represents the largest unit of time, that number being reset to unity when it exceeds a selected value; and an output display unit coupled to the processing unit for displaying the incremental values of the numbers representing units of time.

2. An electronic calculator as in claim 1 wherein:
the number of microinstructions executed to increment the numbers representing the units of time is less than the preselected total of microinstructions; and
the number of microinstructions equal to the difference between the preselected total number of microinstructions and the number of microinstructions executed to increment the numbers representing the units of time is available to the processing unit in the time calculating mode for non-incrementing purposes during an incrementing period.

3. An electronic calculator as in claim 2 wherein the preselected total number of microinstructions executed to 35.

4. An electronic calculator as in claim 1 wherein at least some of the selected values are different.

5. An electronic calculator as in claim 1 wherein at least some of the selected values are the same.

6. An electronic calculator as in claim 1 for use as a stopwatch wherein:
the keys include a plurality of numeric keys, said numeric keys each having a numeric legend;
the storage registers further include a plurality of split-time storage registers for storing numbers representing split times; and
the processing unit is responsive to actuation of one of the numeric keys when the calculator is in the time-calculating mode for storing a number representing a split time in a split-time storage register, the numeric legend for the numeric key being effective for associating the split-time storage register in which that number is stored with the numeric key actuated.

7. An electronic calculator as in claim 6 wherein:
the keys include a plurality of non-numeric keys; and
the processing unit is responsive in the calculator mode to actuation of one of the numeric keys when sequentially preceded by actuation of one of the non-numeric keys for accessing the number stored in the split-time storage register associated with that numeric key for display by the output display unit.

8. An electronic calculator as in claim 6 wherein:
the plurality of storage registers includes first, second, third and fourth storage registers for storing a first number representing hundredths of a second, a second number representing seconds of a minute, a third number representing minutes of an hour, and a fourth number representing hours of a day, respectively; and the processing unit is responsive to the preselected total number of microinstructions it executes every one hundredth of a second for incrementing the first number, for resetting the first number to zero and incrementing the second number when the first number exceeds a first selected value, for resetting the second number to zero and incrementing the third number when the second number exceeds a second selected value, for resetting the third number to zero and incrementing the fourth number when the third number exceeds a third selected value and for resetting the fourth number to unity when said fourth number exceeds a fourth selected value, and for causing the output display unit to provide a visual output indication of the incremental values of the first, second, third, and fourth numbers.

9. An electronic calculator as in claim 8 wherein: the number of microinstructions executed to increment the first, second, third and fourth numbers is less than the preselected total number of microinstructions; and
the number of microinstructions equal to the difference between the preselected total number of microinstructions and the number of microinstructions executed to increment the first, second, third and fourth numbers is available to the processing unit in the time-calculating mode for non-incrementing purposes during an incrementing period.

10. An electronic calculator as in claim 9 wherein the preselected total number of microinstructions executed is 35.

11. An electronic calculator as in claim 8 including a 12 hour time-calculating mode wherein:
the first selected value is 99;
the second and third selected values are 59; and
the fourth selected value is 12.

12. An electronic calculator as in claim 11 including a 24 hour time-calculating mode wherein the fourth selected value is 34.

13. An electronic calculator as in claim 8 for use as a stopwatch, wherein:
the keys include a plurality of numeric keys, said numeric keys each having a numeric legend;
the storage registers further include a plurality of split-time storage registers for storing numbers representing split-times; and
the processing unit is coupled to the split-time storage registers and is responsive to actuation of one of the numeric keys when the calculator is in the time-calculating mode for storing a number representing a split time in a split-time storage register, the numeric legend for the numeric key being effective for associating the split-time storage register in which that number is stored with the numeric key actuated.

14. An electronic calculator as in claim 13 wherein:
the keys include a plurality of non-numeric keys; and
the processing unit is responsive in the calculator mode to actuation of one of the numeric keys when sequentially preceded by actuation of one of the non-numeric keys for accessing the number stored in a split-time storage register associated with that numeric key for displaying by the output display unit.

15. An electronic calculator as in claim 13 wherein the keys include a first non-numeric key for starting the time-calculating mode of the calculator, a second non-numeric key for terminating the time-calculating mode of the calculator, a third non-numeric key for controlling the display of the first number, and a fourth non-numeric key for resetting the first, second, third, and fourth registers to zero.

16. An electronic calculator as in claim 15 wherein the keys further include a fifth non-numeric key for terminating the time-calculating mode of the calculator when the time-calculating means is operating and for starting the time-calculating mode of the calculator when the time-calculating means is not operating.

17. An electronic calculator as in claim 15 wherein:
the processing unit is responsive in the calculator mode to actuation of one of the numeric keys when sequentially proceded by actuation of the second non-numeric key for accessing the number stored in a split-time storage register associated with that numeric key for displaying by the output display unit.

18. An electronic calculator having a calculator mode and a stopwatch mode, comprising:
an input unit including a manually operable means for initiating the mode of operation of the calculator, and a plurality of keys having legends associated therewith;
a plurality of split-time storage registers coupled to the input unit for storing numbers representing split times;
a processing unit, coupled to the input unit and storage registers, responsive to actuation of one of the keys when the calculator is in the stopwatch mode for storing a number representing a split time in a split-time storage register, the legend of the key actuated being effective for associating the split-time storage register in which that number is stored with the key actuated; and
a display unit coupled to the processing unit for displaying the numbers stored in the split-time storage registers.

19. An electronic calculator as in claim 18 wherein the processing unit is responsive in the calculator mode to actuation of said one of the keys in combination with another of the keys for accessing the number stored in the split-time storage register associated with the legend of said one of the keys for display by the output display unit.

20. An electronic calculator as in claim 18 wherein:
the processing unit is responsive in the calculator mode to actuation of said one of the keys when sequentially preceded by actuation of another of the keys for accessing the number stored in the split-time storage register associated with the legend of said one of the keys for display by the output display unit.

21. An electronic calculator as in claim 18 wherein:
the input unit includes non-numeric and numeric keys; and
the keys for entering split times are numeric keys.

22. A combination calculator and real-time clock having a calculator mode and a time-calculating mode comprising a case, an electro-optical digital display on the case, a calculator keyboard on the case, electronic calculator means in the case coupled to the keyboard, and means for coupling the calculator means to the display;
said calculator means including processing means for performing calculator functions in the calculator mode, and including memory means for storing micro-instructions and a plurality of numbers representing progressively larger units of time, said processing means alternatively performing real-time time-calculating functions in the time calculating mode in response to a preselected total number of micro-instructions executed per smallest unit of time being calculated by the processing means for repetitively incrementing the number representing the smallest unit of time, that number being zeroed when it exceeds a selected value, and, following each such zeroing of that number, incrementing the number representing each remaining progressively larger unit of time when the number representing the largest preceding unit of time relative thereto is zeroed, said last mentioned numbers being zeroed when the exceed selected values, unless the number being incremented represents the largest unit of time, that number being reset to unity when it exceeds a selected value.

23. A combination calculator and real-time clock as in claim 24 wherein:
the calculator keyboard further includes a plurality of non-numeric keys; and
the calculator means is responsive to actuation of one of the numeric keys when sequentially preceded by actuation of one of the non-numeric keys for causing the number stored in a split-time storage register associated with that numeric key to be displayed by the display.

24. A combination calculator and realtime clock as in claim 22 for use as a stopwatch, wherein:
the calculator keyboard includes a plurality of numeric keys, said numeric keys each having a numeric legend;
the calculator means further includes a plurality of split-time storage registers for storing numbers representing split times; and
the processing means is responsive to actuation of one of the numeric keys for storing a number representing a split time in a split-time storage register, the numeric legend for the numeric key being effective for associating the split-time storage register in which that number is stored with the numeric key actuated.

25. A device according to claim 22 wherein the display comprises a plurality of light emitting diodes.

26. A device according to claim 22 wherein the display is effective for displaying the hours, minutes, and seconds of time.

27. A device according to claim 26 wherein the display is also effective for displaying hundredths-of-seconds of time.

28. A device according to claim 22 wherein the display also displays the results of calculations performed by the calculator means.

29. A combination calculator and stopwatch having a calculator mode and a stopwatch mode comprising a case, an electro-optical digital display on the case, a calculator keyboard on the case, electronic calculator means in the case coupled to the keyboard, and means for coupling the calculator means to the display;
said calculator means including processing means for performing calculator functions in the calculator mode, and including memory means for storing micro-instructions and a plurality of numbers representing progressively larger units of time, said processing means alternatively performing elapsed-time time-calculating functions in the stopwatch mode in response to a preselected total number of micro-instructions executed per smallest unit of time being calculated by the processing means for repetitively incrementing the number representing the smallest unit of time, that number being zeroed when it exceeds a selected value, and, following each such zeroing of that number, incrementing the number representing each remaining progressively larger unit of time when the number representing the largest preceding unit of time relative thereto is zeroed, said last mentioned numbers being zeroed when they exceed selected values, unless the number being incremented represents the largest unit of time, that number being reset to unity when it exceeds a selected value.

30. A combination calculator, real-time clock and stopwatch having a calculator mode, a time-calculating mode and a stopwatch mode comprising a case, an electro-optical display on the case, a calculator keyboard on the case, electronic calculator means in the case coupled to the keyboard, and means for coupong the calculator means to the display;

said calculator means including processing means for performing calculator functions in the calculator mode, and including memory means for storing micro-instructions and a plurality of numbers representing progressively larger units of time, said processing means alternatively performing real-time time-calculating functions in the time calculating mode and elapsed-time time-calculating functions in the stopwatch mode in response to a preselected total number of micro-instructions executed per smallest unit of time being calculated by the processing means for repetitively incrementing the number representing the smallest unit of time, that number being zeroed when it exceeds a selected value, and, following each such zeroing of that number, incrementing the number representing each remaining progressively larger unit of time when the number representing the largest preceding unit of time relative thereto is zeroed, said last mentioned numbers being zeroed when they exceed selected values, unless the number being incremented represents the largest unit of time, that number being reset to unity when it exceeds a selected value.

31. A device according to claim 30 wherein the display is effective for displaying the hours, minutes, and seconds of time.

32. A device according to claim 31 wherein the display is also effective for displaying hundredths-of-seconds of time.

33. A device according to claim 30 wherein the display also displays the results of calculations performed by the calculator means.

* * * * *

UNITED STATES PATENT AND TRADEMARK OFFICE
CERTIFICATE OF CORRECTION

PATENT NO. : 4,035,627
DATED : July 12, 1977
INVENTOR(S) : Peter D. Dickinson et al.

It is certified that error appears in the above-identified patent and that said Letters Patent are hereby corrected as shown below:

Column 1 of the title page, "[54] SCIENTIFIC CALCULATOR" should read --GENERAL PURPOSE CALCULATOR HAVING SELECTIVE DATA STORAGE, DATA CONVERSION & TIME-KEEPING CAPABILITIES--;

Column 1, line 38, after "is" insert --in--;

Column 4, line 39, "34" should read --24--;

Column 4, line 63, "displaying" should read --display--;

Column 5, line 17, "displaying" should read --display--;

Column 6, line 15, "the" should read --they--;

Column 7, line 20, "coupong" should read --coupling--.

Signed and Sealed this

Twenty-fifth Day of October 1977

[SEAL]

Attest:

RUTH C. MASON
Attesting Officer

LUTRELLE F. PARKER
Acting Commissioner of Patents and Trademarks